May 12, 1964     A. T. COURT     3,132,620
SAILBOAT

Filed Jan. 11, 1960     6 Sheets-Sheet 1

INVENTOR.
ANDREW T. COURT
BY
Ballisffand McKinley

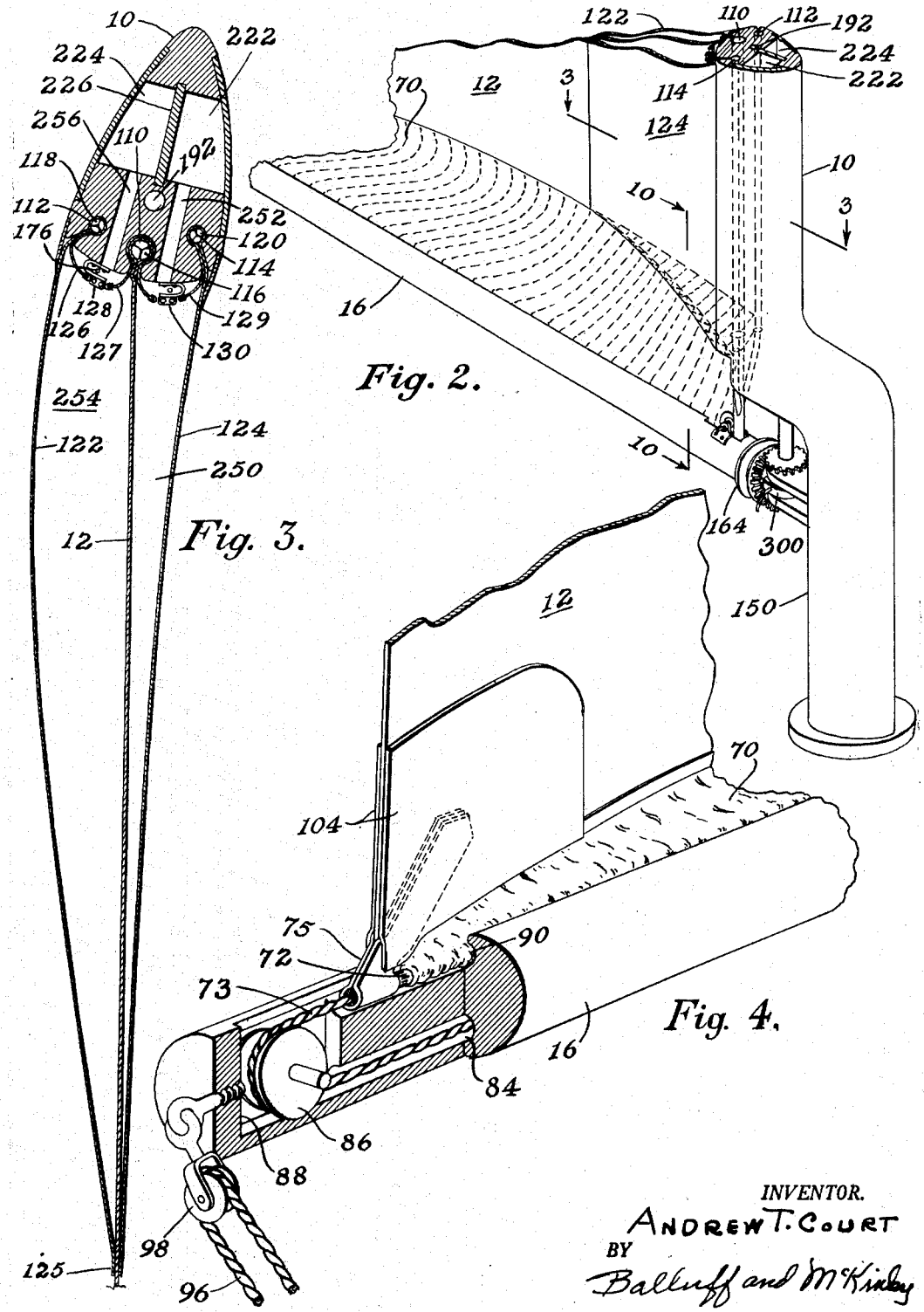

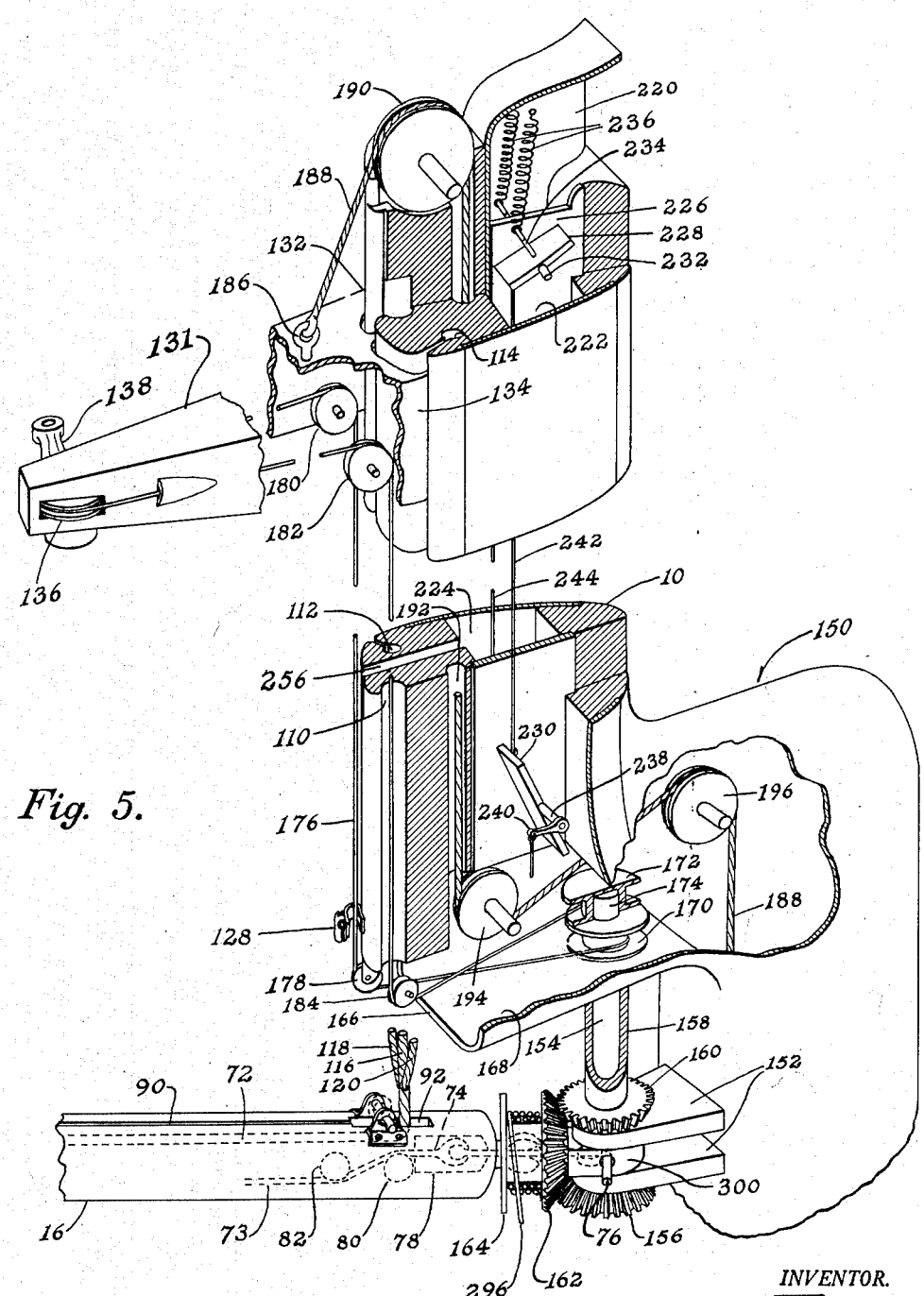

May 12, 1964  A. T. COURT  3,132,620
SAILBOAT
Filed Jan. 11, 1960  6 Sheets-Sheet 4
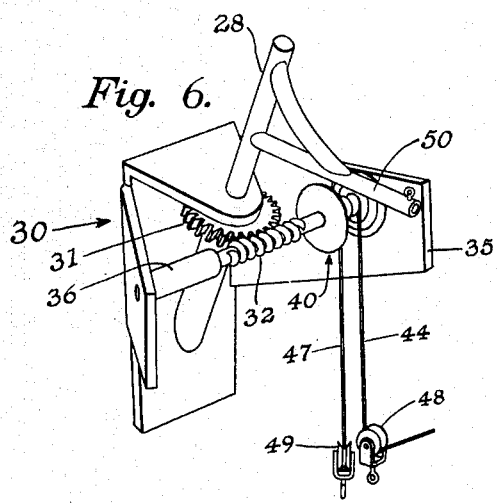
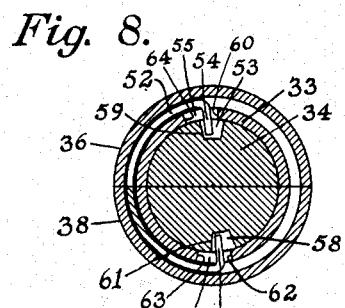
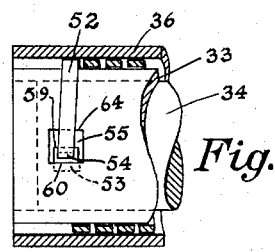
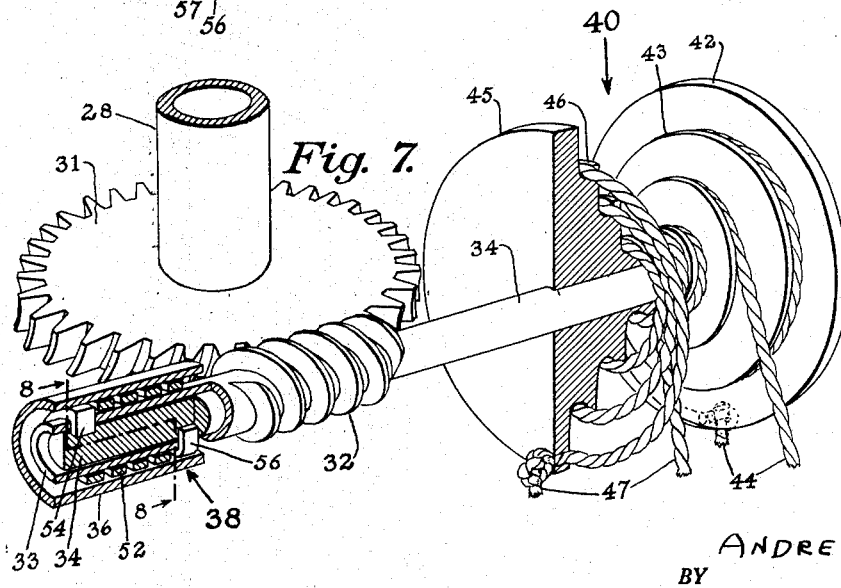
INVENTOR.
ANDREW T. COURT
BY
Balluff and McKinley May 12, 1964 A. T. COURT 3,132,620
SAILBOAT
Filed Jan. 11, 1960 6 Sheets-Sheet 5
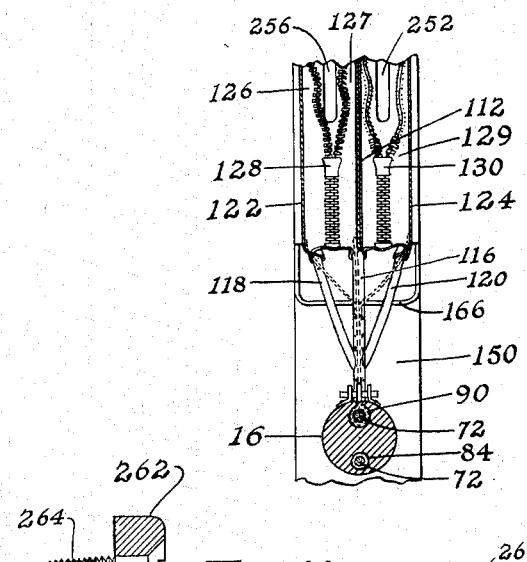
Fig. 10.
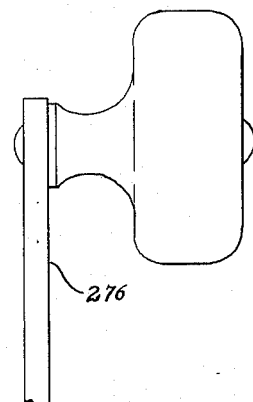
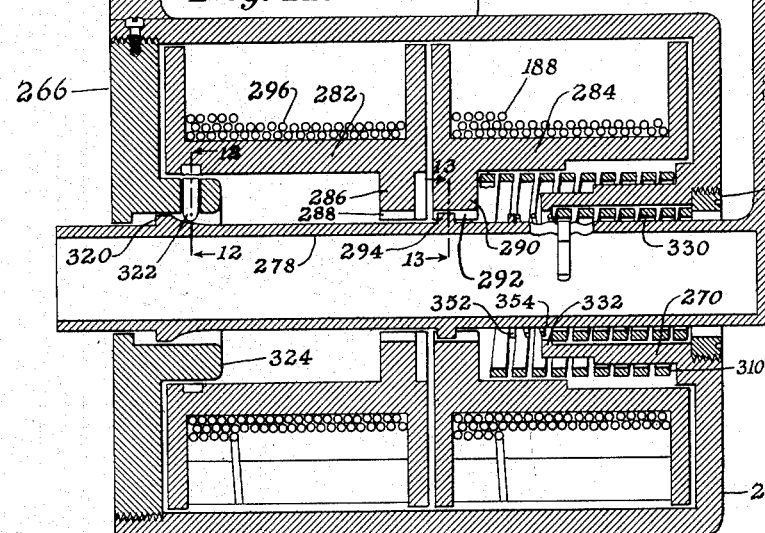
Fig. 11.
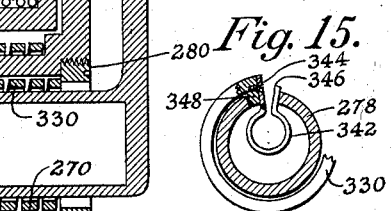
Fig. 15.
Fig. 14.
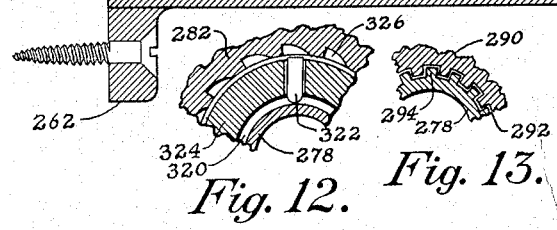
Fig. 12. Fig. 13.
INVENTOR.
ANDREW T. COURT
BY
Balluff and McKinley May 12, 1964     A. T. COURT     3,132,620
SAILBOAT
Filed Jan. 11, 1960     6 Sheets-Sheet 6
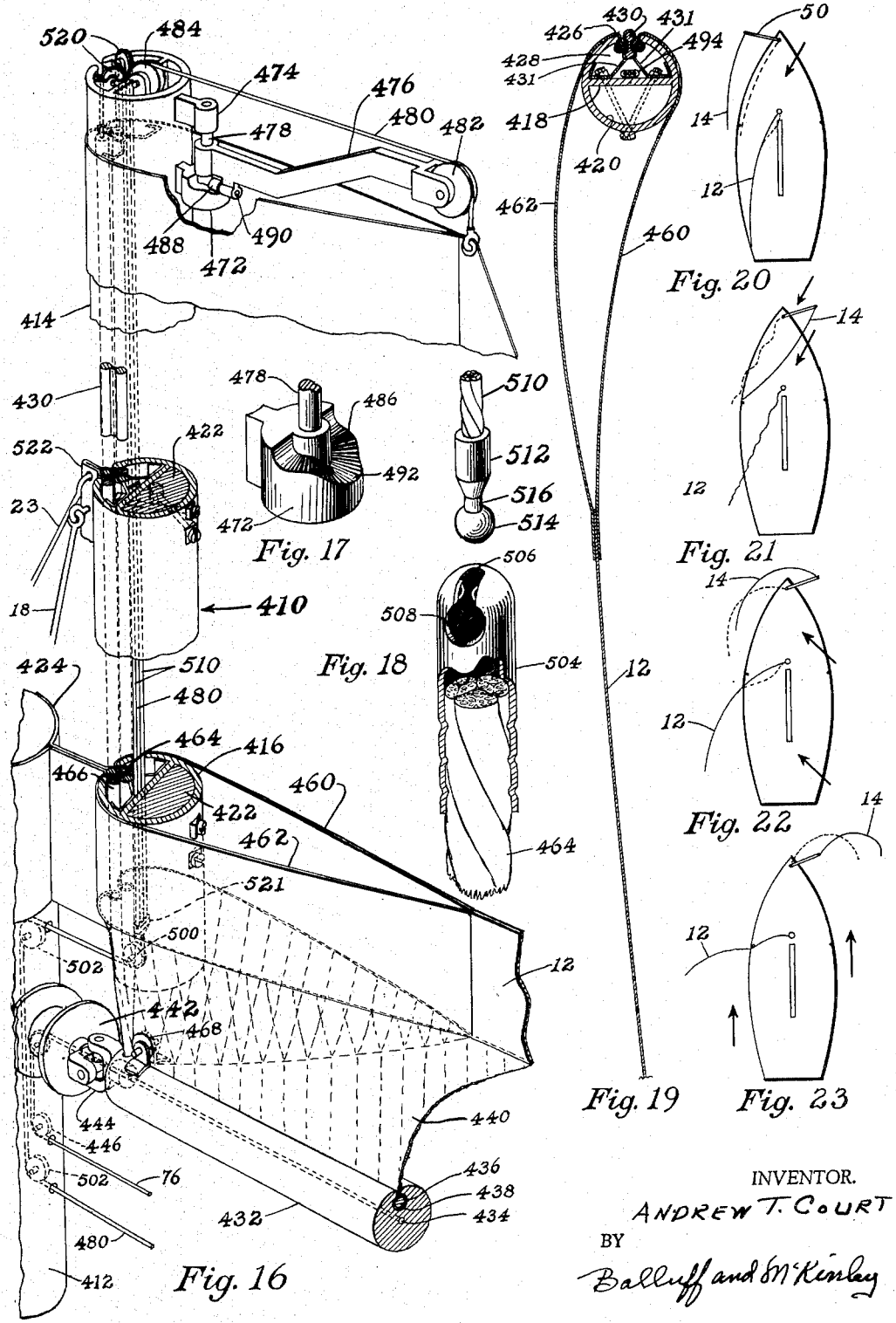
INVENTOR.
ANDREW T. COURT
BY
Balluff and McKinley United States Patent Office 3,132,620
Patented May 12, 1964

3,132,620
SAILBOAT
Andrew T. Court, 1517 Iroquois, Detroit 14, Mich.
Filed Jan. 11, 1960, Ser. No. 1,645
9 Claims. (Cl. 114—39)

This invention relates to sailboats and has particular reference to a fore-and-aft rigged sailboat. In general, this invention is directed to a novel construction and rigging for the jib and the mainsail and to certain control means for the jib and mainsail to obtain improved performance from a given sail area and to facilitate handling of the sails.

One of the critical problems in sailing a boat is adjusting the camber and angle of the sail for a maximum thrust vector in the direction of motion. When an airfoil is "rough" aerodynamically, that is—when it provokes turbulence near the leading edge, the attitude of maximum lift is not clearly defined; in other words, the stall point comes gradually. Recognizing this, airfoils for private aircraft are made rougher than need be so that, in case of dough weather, the pilot doesn't stall accidentally due to a sudden unanticipated variation in the angle of attack.

In a boat where the propulsion is provided by the airfoil, holding the airfoil at the optimum point becomes much more important and the smoother entry which is provided by multiple luffed sails has a sharp transition which makes this easier. The use of a stiff plastic sail also aids in an optimum disposition of the sail because incipient stall or too low an angle of attack provokes incipient turbulence that causes the sail to make an audible sound. In other words, the sail acts as a diaphragm and continually indicates to the crew just how smooth the air flow is. This feature is not available with the horizontal cloth sails nor with previous sails made of one or two mil plastic which is too thin to act as an effective diaphragm.

The invention contemplates an adjustable supporting device for the jib to enable positioning of the jib so as to reduce interference between the jib and mainsail and thereby permit sailing closer to the wind than would otherwise be possible. This device also reduces weather helm before the wind and facilitates coming about in a high wind, as described below. The invention further contemplates a novel mainsail construction and rigging therefor calculated to obtain greater efficiencies from the mainsail than have heretofore been possible. A further feature of the invention is the provision of a novel winch mechanism for raising and lowering the mainsail with a minimum of effort by one person. Other novel features of the invention will be apparent as the description of the invention proceeds.

It is a principal object of the invention to provide a new and improved fore-and-aft rigged sailboat.

It is another object of the invention to provide an improved mainsail construction and control means therefor in a sailboat of the type described.

A further object of the invention is to provide a new and improved jib supporting means for a sailboat.

Another object of the invention is to provide a fore-and-aft rigged sailboat possessing many advantages and greater efficiencies than can be obtained with conventional sailboats of this type.

Other and further objects of the invention will be apparent from the following description and claims and may be understood by reference to the accompanying drawings, of which there are six sheets, which by way of illustration show preferred embodiments of the invention and what I now consider to be the best mode in which I have contemplated applying the principles of my invention. Other embodiments of the invention may be used without departing from the scope of the present invention as set forth in the appended claims.

In the drawings:

FIG. 2 is a fragmentary perspective view of the lower portion of the mast and the forward end of the boom;

FIG. 3 is a sectional view taken on line 3—3 of FIG. 2;

FIG. 4 is a fragmentary perspective view with parts broken away of the trailing end of the boom;

FIG. 5 is a perspective view with parts broken away illustrating portions of the mast and boom and the control means for the mainsail;

FIG. 6 is a fragmentary perspective view illustrating the adjustable supporting means for the jib;

FIG. 7 is an enlarged view of a portion of the structure shown in FIG. 6, with parts broken away;

FIG. 8 is a sectional view of a no-back device taken on line 8—8 of FIG. 7;

FIG. 9 is a fragmentary elevational view illustrating one end of the no-back device;

FIG. 10 is a sectional view through the mainsail taken on line 10—10 of FIG. 2;

FIG. 11 is a sectional view through a novel winch employed in the present invention;

FIG. 12 is a fragmentary sectional view on line 12—12 of FIG. 11;

FIG. 13 is a fragmentary sectional view on line 13—13 of FIG. 11;

FIG. 14 is a fragmentary plan view of the detent mechanism employed in the winch;

FIG. 15 is a sectional view taken on line 15—15 of FIG. 14;

FIG. 16 is fragmentary perspective view illustrating a modified mast and mainsail construction;

FIG. 17 is a perspective view illustrating a cam block employed in the modified construction shown in FIG. 16;

FIG. 18 is a perspective view of a novel form of connector employed in the modified form of the invention;

FIG. 19 is a horizontal sectional view through the mast and mainsail shown in FIG. 16; and FIGS. 20 to 23 are schematic views illustrating various settings of the jib and mainsail that may be obtained with the present invention.

Figure 1:
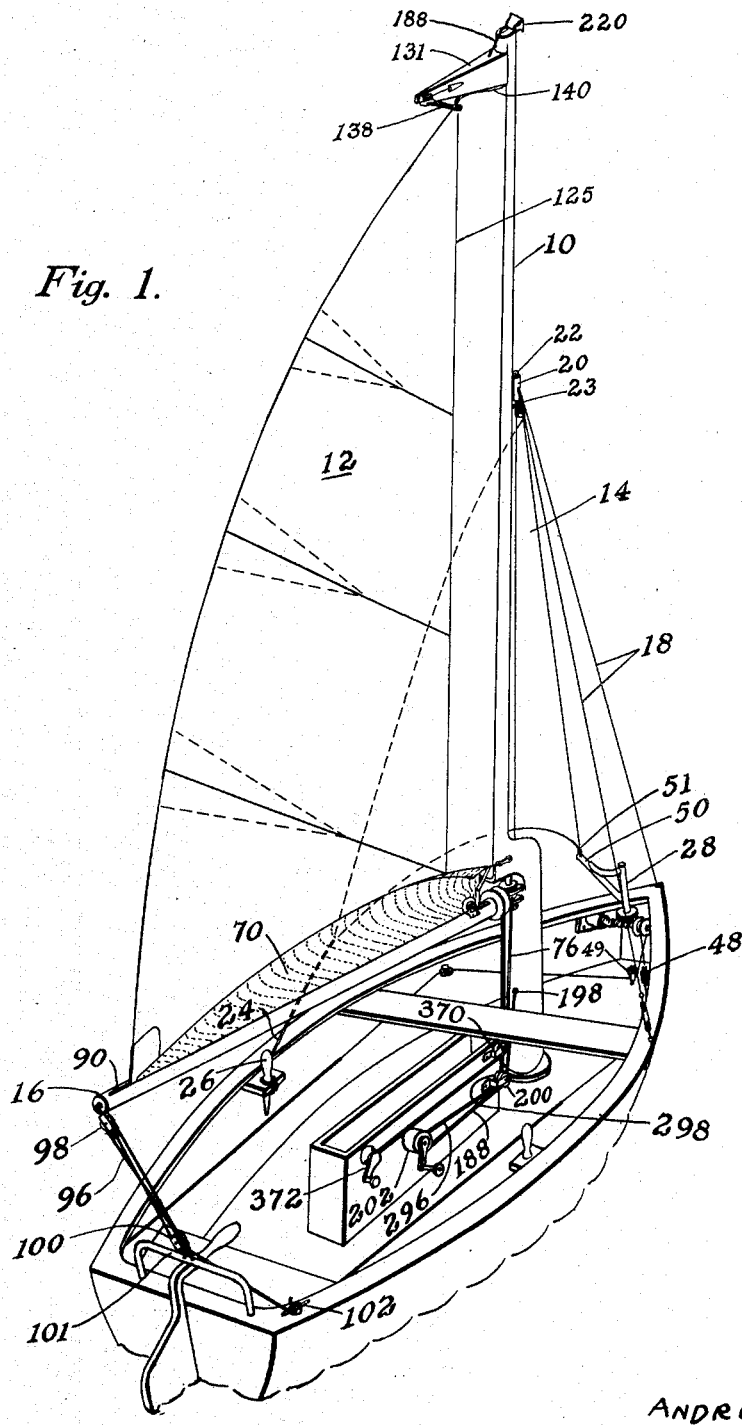
FIG. 1 is a perspective view of a sailboat embodying the present invention.

In FIG. 1 there is disclosed a fore-and-aft rigged sailboat having a mast 10, a mainsail 12, and a jib 14. The foot of the mainsail 12 is secured to the boom 16, while the forward edge or luff of the sail 12 is secured to the mast 10. The mast is supported by a series of stays 18 secured at their lower ends to the hull of the boat and at their upper ends to a cylindrical sleeve 20 journaled on a bracket 22 secured to the leading edge of the mast 10 at a suitable elevation.

The jib 14 is supported at its upper end from a halyard 23 running through a sheave connected to the sleeve 20, while sheet 24 is connected to the jib clew and to the trimming pin 26. The tack of the jib is supported by an adjustable bowsprit arm 50 in a novel manner in accordance with this invention.

As shown in FIGS. 1, 6 and 7, a shaft 28 is journaled in and supported by a bracket 30 located at the bow of the boat. The shaft 28 lies on the centerline of the boat and is inclined so that its projected axis intersects sleeve 20. A gear 31 is secured on shaft 28 and is meshed with a worm 32 formed on a sleeve 33 rotatably supported on a drive shaft 34, one end of which is journaled in an arm 35 of bracket 30. The other end of the shaft 34 and the worm sleeve 33 extend into a fixed tubular member 36 supported on an opposing arm of the bracket 30. The tubular member 36 contains a spring which cooperates with the shaft 34, sleeve 33 and member 36 to form a no-back device 38 to be described hereinafter. A double fusee 40 is secured on the shaft 34 and includes a section 42 having a conical spiral groove 43 on which is wound one end of a line 44, and a section 45 having a conical spiral groove 46 about which is wound one end of a line 47. The lines 44 and 47 extend around blocks 48 and 49, respectively, then around additional blocks along the sides of the boat back to a position accessible to the skipper or crew.

The forward ends of the control lines 44 and 47 are secured to fusees 42 and 45, respectively, adjacent the outer edges thereof, and are wound around the spiral grooves 43 and 46 in opposite directions so that a pull on one of such lines will rotate the drive shaft 34 in one direction and a pull on the other line will rotate the drive shaft in the opposite direction. This arrangement winds up one line as the other is unwound.

The shaft 28 is provided with an arm 50 extending laterally therefrom and the jib tack 51 is secured to the outer end of arm 50 in a suitable manner. It will be seen that, upon rotation of the shaft 28 by means of worm 32 and gear 31 meshed therewith, the jib tack may be swung in a circular arc about the axis of shaft 28 to any desired position, depending upon the angle of the wind. For example, if the wind is off the starboard bow, the jib and mainsail would be positioned approximately as indicated in FIG. 20, from which it will be seen that the adjustable bowsprit 50 is swung around to the port side, thereby substantially increasing the clearance between the jib and the mainsail to prevent the jib from backwinding the mainsail. The position of the jib in a conventional rigged boat is indicated by the dotted lines and the direction of the wind by the arrows in FIGS. 20–23.

Biplane designers recognize the fact that the further apart the wings the more effective the function of each. In modern monoplanes the tail surface is raised well above the level of the wings so that it can work on fresh air rather than having its function reduced by virtue of the turbulence from the main wing and the propellers. Moreover, discussions of sailboat design frequently point out that a catboat can point five degrees higher than a sloop and a sloop points five degrees higher than a schooner, etc., the reason being that each sail interferes with the sail immediately behind it when the boat is close-hauled. In fact, the prior art describes boats in which the mast is moved to windward n order to eliminate this sort of interference. Obviously moving the bowsprit is must more practical than moving the mast.

There have been boats with loose bowsprits that moved to windward simply by virtue of pressure on the jib, but this is really not a workable idea because, if there is an overlapping jib, which is generally recognized as the best practice, the jib can't clear the forestay automatically, and this makes this rig very clumsy to handle.

In addition to reducing intersail interference, the adjustable bowsprit described above has two other salient advantages in modern type boats. When coming about, the jib can be backwinded, that is—its leading edge moved to windward to the point where the pressure comes on what was previously the leeward side of the jib before the boat hull itself has been able to make any substantial change in azimuth. This backwinding of the jib to help the boat come about promptly and positively is a well-recognized technique. However, with the arrangements known heretofore, it required a crew member going forward and hooking a pole into the clew of the jib and pushing it far out to leeward, all of which was slow and clumsy compared with the present controllable bowsprit which requires only a single pull of the control lanyard by the skipper or any member of the crew in order to backwind the jib fully and positively. Backwinding of the jib, which at the same time puts the jib tack into position for the next leg, is shown in FIG. 21.

A third advantage of this controllable bowsprit is developed when running well ahead of the wind with both the jib and main bellying far out to leeward. Under these conditions the center of pressure moves so far to leeward in conventionally rigged boats that sloops tend to have heavy weather helm, that is—they want to turn into the wind. This has to be corrected with a good deal of pull on the tiller, which increases the resistance of the hull in the water. This is so important that good sailors frequently will partially spoil the airfoil shape of the main to let the jib do most of the work. This situation is provided for in the case of yawls and ketches by a second mast and staysail which can be used to balance the helm. The adjustable bowsprit described herein provides the same advantages for sloops because the tack of the jib can be moved to windward, as shown in FIG. 22, which has the effect of moving the composite center of pressure to the two sails closer to the centerline of the boat and thus reducing the weather helm.

In fact, when running wing and wing directly ahead of the wind with the jib on the opposite side from the main, as shown in FIG. 23, the adjustable bowsprit provides a similar advantage by allowing the jib, which is the smaller sail, to be moved further out from the centerline of the boat, thereby coming closer to balancing the main and also positioning the jib so that it suffers from less of the interference which comes from the main.

The lines 44 and 47 are arranged in the spiral grooves 43 and 46 in such a maner that, when arm 50 is at the center of its permissible travel, i.e., pointing astern, the lines react against the smallest diameter grooves. As the arm swings in either direction from its central position, one line unwinds from and the other line winds onto the groove on one of the sections 42 and 45, both lines reacting against an increasingly larger diameter on the same fusee section, with the line which is winding up lagging the other by about 180° around the spiral groove. As the arm approaches its central position from either end of its stroke, the lines react against an increasingly smaller diameter on one section until the central position is reached, and then against an increasingly larger diameter on the other section as the arm swings to the other end of its stroke. The fusee 40 thus makes it possible to obtain a rapid swing of the arm 50 relative to the motion of lines 44 and 47 during the middle portion of its arc from one side to the other, and a relatively slow movement of the arm 50 at either end of its stroke. The entire length of the arc of arm 50 is preferably more than 180°.

The no-back device 38 includes the fixed tubular member 36 and a spring 52 confined between said tubular member 36 and the worm sleeve 33, which is rotatable to a limited degree on drive shaft 34. As shown in FIGS. 8 and 9, the drive shaft 34 is provided with a recess 53 into which a bent-over end or lip 54 of the spring 52 projects through a slot 55 in the worm sleeve 33. The other end 56 of the spring 52 extends through a slot 57 in the sleeve 33 and into a recess 58 in the drive shaft 34. The no-back device will permit the worm sleeve 33 to be driven in either direction of rotation upon rotation of the drive shaft 34 through the sheaves 42 and 45. The arrangement of the slots referred to in the drive shaft and worm sleeve is such that the sleeve cannot be driven by a force applied directly thereto through gear 31 resulting from the force of the wind or the sheet 24 against the jib 14.

It will be seen from FIG. 8 that, if the drive shaft 34 is driven in a clockwise direction, the shoulder 59 defined by the slot 53 will engage the end 54 of the spring 52 tending to contract the coils of the spring and thereby permit the spring to rotate with the drive shaft 34 within the fixed housing 36. The end 54 of the spring will then travel a slight distance through the slot 55 in sleeve 33 until it engages the end 60 of the slot 55 to thereupon drive the worm sleeve 33 with the drive shaft 34 in a clockwise direction. Similarly, upon counterclockwise rotation of the drive shaft 34, the shoulder 61 defined by recess 58 will engage the end 56 of the spring 52 to rotate the spring with the shaft 34. As soon as the end 56 of the spring engages the shoulder 62 of slot 57 in the sleeve 33, the sleeve will be driven with the drive shaft in a counterclockwise direction. However, if a force is exerted directly on the worm sleeve 33, such as through the gear 31, for example, in a counterclockwise direction as viewed in FIG. 8, the shoulder 60 defining one end of the slot 55 will engage the end 54 of the spring in a direction tending to expand the coils of the spring into locking engagement with the fixed housing 36, thereby preventing rotation of the sleeve 33. The length of the slots 55 and 57 in the worm sleeve is such that the shoulder 60 will engage the spring to expand the same into locking engagement with housing 36 prior to engagement by shoulder 63 of slot 57 with the other end 56 of the spring, which engagement, if it occurred, would tend to contract the spring. Rotation of sleeve 33 in a clockwise direction by a force applied directly thereto is prevented in a similar manner since shoulder 62 will engage the end 56 of the spring to expand the latter prior to engagement of the shoulder 64 with the other end of the spring.

The no-back device 38 provides a relatively simple device for preventing rotation of the bowsprit supporting shaft 28 except through the use of either of the line 44 or 47, and at the same time permits the use of a low enough ratio between the worm 32 and the gear 31 to permit rotation of the gear 31 and its shaft 28 through a relatively large arc without the necessity of excessive hauling on the lines 44 or 47. The low ratio necessary to obtain rapid swinging of the bowsprit 50 would permit reverse drive from the gear 31 to the worm sleeve 33, but such reverse drive is prevented by the no-back device 38.

The mainsail 12 is of novel construction and preferably is formed of a plastic sheet material such as Mylar polyester. This material is fairly stiff and very smooth and thus able to function at low angles of attack without fluttering even though few or no battens are used. By the provision of a pliable section or gusset 70 interposed between the lower edge of the sail 12 and the boom 16, the sail can assume widely varying curvatures. The flexible gusset 70 makes it possible to use a sail of plastic sheet material which is stiff enough to resist fluttering while permitting the curvature of the sail to be changed as wind conditions demand.

Outhaul 73 is attached to footrope 72 at sail clew 75. The rope 72 is made of an elastic material such as shock cord and runs through a channel in the gusset material 70. The outhaul 73 has one end 74 secured to a control line 76 within a socket 78 located in a cavity in the forward end of the boom 16. The outhaul 73 then passes over a block 80 and under a second block 82 and extends through a channel or bore 84 extending substantially the full length of the boom 16. The outhaul 73 then passes around a sheave 86 located within a recess 88 formed at the trailing end of the boom 16 and then is spliced to the elastic footrope 72 within the clew reinforcement 75. The elastic footrope extends back through a channel 90 extending longitudinally along the top of the boom and through which the pliable section 70 forming the foot of the sail 12 extends. The rope 72 then passes upwardly through a slot 92 at the forward end of the boom 16.

The boom is secured in a selected azimuth by a sheet 96 passed around a block 98 supported from the end of the boom and then passed around a second block 100 in the usual manner. The clew of the sail 12 may be suitably reinforced, as indicated at 104.

In order to reduce turbulence, the forward edge or luff of the sail 12 is faired into the mast 10 in the manner shown in FIGS. 2, 3, 5 and 10. The mast is streamlined and is provided with three vertically extending channels 110, 112 and 114 on its trailing edge. The elastic rope 72, after passing upwardly through the slot 92 in the boom 16, is spliced into three separate inelastic ropes 116, 118 and 120. The rope 116 extends through the larger central channel 110 and ropes 118 and 120 extend through the channels 112 and 114, respectively. As indicated in FIG. 3, the luff of the sail 12 is fastened to the rope 116, and the sail extends rearwardly from the channel 110 through a slot in the mast leading to the channel 110. Two fairing panels 122 and 124 have their forward edges secured to the ropes 118 and 120 within the channels 112 and 114, respectively. The fairing sections 122 and 124 extend from the mast rearwardly in spaced relation to the main body 12 of the sail and are secured thereto by cementing or otherwise along a line indicated at 125 in FIG. 1 a suitable distance rearwardly of the mast. A fabric tape attached to the forward edge 126 of the fairing panel 122 is secured by a zipper 128 to one edge of a flexible strip 127 disposed within channel 110 with its opposite edges extending outwardly through the channel 110 on opposite sides of the mainsail 12. The forward edge 129 of the panel 124 is secured to the other edge of strip 127 by a zipper 130. The space between each fairing panel and the mainsail 12 thus forms a pocket which may be inflated in a manner to be described hereinafter to obtain the desired streamlining of the juncture of the mainsail and mast with consequent reduction in turbulence. To cover the remaining slight gap between the mast and the fairing panels on each side, a lip of rather stiff plastic material is cemented to the mast just ahead of the entry slot for the panel projecting rearwardly so that it covers the aforementioned slot.

At its upper end the mast is provided with a headboard 131 having a pair of arms 132 and 134 extending into the channels 112 and 114. The headboard 131 is slidably mounted on the mast and is provided with a sheave 136 at its trailing end. An arm 138 is secured to and rotatable with sheave 136 and the gaff of the sail 12 along junction 125 is adapted to be secured to the outer end of arm 138. The upper ends of the bolt ropes 118 and 120 are secured to the arms 132 and 134 of the headboard 131.

The upper ends of the inflatable spaces between the mainsail 12 and the fairing sections 122 and 124 are sealed by a cover strip 140. The lower ends of such spaces are closed by the gusset 70, which has three plies or thicknesses, at least at its forward end as shown in FIGS. 2 and 10, with the sheet 12 and fairing panels 122 and 124 secured thereto. The forward edges of the several plies of the gusset 70 are secured to the lower ends of the strips which carry the zippers 128 and 130, thereby to substantially seal the inflatable fairing spaces except for their connection with a source of ram air pressure as will be described. The zippers 128 and 130 preferably extend nearly the full height of the sail, but allow communication between the inflatable spaces with a source of air under increased or reduced pressure even when the sail is reefed by being wound partially on the boom 16. These spaces need not be completely airtight, but only to the extent necessary to enable them to be inflated, as will be described.

The mast 10 is provided at its upper end with an air scoop 220 and is hollowed out to define two air passages 222 and 224 separated by divider plate 226. As best shown in FIG. 5, each of the passages 222 and 224 is provided with an upper valve plate 228 and a lower valve plate 230. Each of the upper valves 228 is rotatably supported on a pin 232 adjacent the air scoop 220 and is provided with an arm 234 to which is connected a spring 236 urging the valve 228 toward its closed position shown in FIG. 5, in which the valve closes or substantially closes its air passage. The lower valve 230 in each passage is rotatably supported on a pin 238 which extends through the appropriate side of the mast 10 and is provided with an arm 240 for operating the valve means in its passage. A cord 242 provides a connection between the upper and lower valves 228 and 230 in the air passage 222, and a cord 244 provides a similar connection between the corresponding valves in the air passage 224.

When it is desired to connect the space 250 between the mainsail 12 and the fairing panel 124 to ram air pressure to inflate such space to the desired contour, the arm 240 at the starboard side of the mast is rotated in a counterclockwise direction as viewed in FIG. 5 to close the valve 230 at the lower end of the air passage 222. The upper valve 228 will be opened at such time through the connection 242 between the two valves. The air scoop will then pick up air under the ram pressure which results from the forward motion of the boat and force such air through the passage 222 and out through a discharge slot 252 leading from passage 222 into the space 250. In a similar manner the valves in the port passage 224 may be manipulated by the other arm 240 to connect the space 254 between the mainsail 12 and fairing panel 122 to ram air pressure through a discharge slot 256 leading from passage 224 into the space 254. By appropriate regulation of the valve means in the respective air passages 222 and 224 the pressures in the spaces 250 and 254 may be regulated to achieve the desired degree of curvature of the forward portion of the sail where the latter joins the mast 10. If desired, the valves in both passages may be actuated together by an interconnecting shaft actuated by means of a single control arm such as 240, and arranged so that, when either air passage is open, the other is closed.

It is to be noted that space 168 at the lower end of the mast 10 is connected to the bottom of both of the air channels and opens backwardly, thus providing a certain degree of venturi suction which can serve to collapse the fairing panel to which it is connected by suitable manipulation of the valves.

It might be noted that it is only when the boat is beating, that is, moving toward the wind, that the smooth aerodynamic shape of mast and sail is important. On reaches and runs where the wind is abeam or abaft most of the work is drag and the failure of ram effect to provide air for filling the fairing pockets is of no importance.

The lower end of the mast 10 is offset, as indicated at 150, to provide clearance for the leading edge bolt ropes when reefing or furling the sail by winding it on the boom.

The mast is provided with a pair of supporting lugs 152 projecting from the trailing edge of the offset portion 150. A shaft 154 is rotatably journaled in the lugs 152 and has a bevel gear 156 secured on its lower end. A sleeve 158 is rotatable on shaft 154 and has a bevel gear 160 secured thereon. The bevel gears 156 and 160 are both meshed with a bevel gear 162 carried by a reel 164 secured on the forward end of the boom 16. The shaft 154 and sleeve 158 extend upwardly through the lower wall 166 of the main portion of the mast 10 into the hollow space 168 opening from the trailing edge of the mast into the hollow offset section 150. A winding drum 170 is secured on the upper end of sleeve 158 and a second winding drum 172 is secured on the upper end 174 of the shaft 154 which projects upwardly through the upper end of the sleeve 158. A line 176 has one end secured to the drum 170 and is passed around a block 178 secured to the lower end of the mast 10. The line 176 then passes upwardly alongside the trailing edge of the mast, between the mast and the flexible strips secured by the zipper 128, around a sheave 180 mounted within the headboard 131, then around sheaves 136 and 182, from which the line extends downwardly along the trailing edge of the mast and around sheave 184 into the recess 168. The other end of line 176 is secured to the drum 172.

The head board 131 is provided with a lug 186 to which one end of a halyard 188 is secured. The halyard 188 extends over a sheave 190 located at the upper end of the mast 10 and then extends downwardly through a bore or channel 192 in the mast and around a sheave 194 disposed within the recess 168 at the lower end of the mast. The halyard 188 then extends around a sheave 196 at the upper end of the offset portion 150 of the mast and downwardly therethrough and through an opening 198 in the mast and around a sheave 200. The end of halyard 188 is secured to one drum of a winch indicated at 202. It will be seen that, when the halyard 188 is wound upon its drum by the winch 202, the headboard 131 and the sail attached thereto will be raised.

The winch 202 is illustrated in FIGS. 11 to 15 and comprises a casing having a generally cylindrical wall 260 and a plurality of attaching lugs 262 by means of which the winch may be secured by screws 264 at a suitable location on the boat. The casing is provided with a detachable inner end wall 266 and an integral outer end wall 268 having an integral collar portion 270 extending generally parallel to and concentric with the outer peripheral wall 260 of the winch housing. A crank 274 having a handle portion 276 is connected to and drives a hollow tubular stem 278 having its inner end journaled in the end wall 266 and its outer end journaled in a removable end cap 280 in the end wall 268.

A winding drum 282 is journaled for rotation within the inner end of the winch casing and a second winding drum 284 is rotatably supported within the outer end of the winch casing. The drum 282 is provided with an inwardly extending collar 286 having internal splines 288 thereon, and drum 284 has a similar collar 290 provided with internal splines 292. The tubular stem 278 of the crank 274 is provided intermediate its ends with external splines 294 adapted to be meshed either with the splines 288 on drum 282 or with the splines 292 on winding drum 284.

The halyard 188, which has one end connected to the headboard 131, has its other end wound upon drum 284. A reefing line 296 has one end wrapped around drum 282 and then extends outwardly through the winch casing and around a block 298 and has its other end secured to the reel 164 at the forward end of the boom 16. The reel 164, bevel gear 162 and the boom 16 are rotatable together on a bearing member 300, which is received between the supporting lugs 152 and through which the shaft 154 extends so that the bearing element 300 and the boom carried thereby may be rotated about the axis of shaft 154.

The mainsail 12 may be reefed or furled by rolling the same on the boom 16. This operation is effected through the winch 202 by inserting the crank stem 278 into the winch casing until the splines 294 on the crank stem mesh with the teeth 288 on the winding drum 282. Rotation of the crank 274 in a clockwise direction will thereupon wind the line 296 on the drum 282 and unwind the line 296 from the reel 164 to rotate the latter together with boom 16 and bevel gear 162. During this operation it is necessary to allow the halyard 188 to unwind from drum 284 in order that the sail may be lowered. The brake drag mechanism effecting such controlled unwinding of the halyard 188 will be described hereinafter.

As the line 296 is pulled off the drum 164 and wound upon onto winch drum 282, the bevel gear 162 and the boom will be rotated in a counterclockwise direction as viewed from the forward end of the boom, thereby effecting clockwise rotation of bevel gear 156, shaft 154 and winding drum 172, and counterclockwise rotation of bevel gear 160, sleeve 158 and winding drum 170, as viewed from above. As the boom is turned on its axis, the ropes 116, 118 and 120 and the mainsail and fairing panels secured thereto will be wound or rolled upon the boom, the headboard 131 sliding downwardly through the channels 112 and 114 as the halyard 188 is allowed to unwind from the winch drum 284. The line 176 will be wound upon on the winding drums 170 and 172, thereby taking up the slack in line 176 which occurs as the headboard 131 is lowered.

When the sail is to be raised after being rolled on the boom 16, halyard 188 is wound up on the winch drum 284, which raises the headboard 131 and the bolt ropes 116, 118 and 120 within their respective channels 110, 112 and 114. During this operation it is necessary to allow the boom 16 and the reel 164 and bevel gear 162 to rotate freely on the bearing element 300, which will effect winding of line 296 on reel 164 and therefore requires that the line 296 be allowed to unwind freely from winch drum 282. As the sail is unwound from the boom, rotation of the boom and the bevel gear 162 will rotate gears 156 and 160 and the winding drums 172 and 170 in opposite directions to permit the line 176 to be unwound from both drums 172 and 170.

In order to effect the above described operations, the crank handle 274 has a plurality of axial positions within the winch casing. In its innermost axial position or the position furthest to the left as viewed in FIG. 11, the crank stem 278 is splined to the drum 282 as previously described to effect winding up of the line 296 on the drum 282 and consequent rotation of the boom on its axis. During this operation the controlled unwinding of drum 284 is effected by the provision of a left-hand helical spring 310 which has its one end confined within the hub portion of the drum 284 and its other end wrapped around the collar 270 on the winch casing.

The spring 310 has a quite tight fit with the drum 284 and a finger-press fit over collar 270 so that the drum 284 will frictionally engage the spring 310 and wrap the coils of the spring around the collar 270 when the drum rotates in a counterclockwise direction. The spring 310 will therefore lock itself against the collar 270 and the heavy frictional engagement of the drum 284 and the spring will prevent free unwinding of the drum 284. The headboard 131 and the sail supported thereby will therefore be lowered at a controlled rate commensurate with the rolling of the sail on the boom 16. The friction between drum 284 and spring 310 will be sufficient to support the weight of the sail.

The second or intermediate position of the crank stem 278 is illustrated in FIG. 11 and this intermediate position of the crank is employed for raising the mainsail. In this position the teeth 294 on the crank stem are meshed with the splines 292 on the drum 284 so that the halyard 188 may be wound up on drum 284 upon clockwise rotation of the crank handle 276. The spring 310 will tend to unwrap from collar 270 and rotate freely with the drum in a clockwise direction. As the halyard 188 is wound onto drum 284, the headboard 131 to which the other end is secured will be raised to raise the mainsail, which is supported from the arm 138 and by the bolt ropes 116, 118 and 120. In this position of the crank stem the drum 282 is allowed to unwind freely. As the sail is elevated the ropes 116, 118 and 120 will unwind from the boom 16, thereby rotating the boom in a clockwise direction as viewed from the forward end thereof. Rotation of the boom as the sail is being raised will effect rotation of winding drums 170 and 172 in a direction to permit the line 176 to unwind therefrom.

The third operative position of the crank stem 278 is employed for purposes of tightening the sail 12 and in this position the teeth 294 on the crank stem are moved further toward the right as viewed in FIG. 11 but still maintained in engagement with the splines 292 on the drum 284. In this position of the crank stem the drum 282 is locked to prevent unwinding thereof and consequent rotation of the boom 16. As shown in FIGS. 11 and 12, the inner end of the crank stem 278 has an annular shoulder 320 which in this position of the crank stem engages a locking pin 322 which extends through a radial opening in an annular collar 324 formed on the end plate 266. The inner periphery of the drum 282 adjacent its inner end is provided with an annular row of notches 326, any one of which is adapted to receive the upper end of the locking pin 322 when the latter is cammed upwardly by the flared shoulder 320 on the crank stem 278. With the crank stem in its outermost operative position as described, the pin 322 will engage one of the notches 326 to lock the drum 282 against unwinding, while the crank stem will be splined to the drum 284 to permit tightening of the halyard 188 and the sail supported therefrom.

The crank 274 may be rotated only in one direction and return movement thereof is prevented by a clockwise wound brake spring 330 confined between the collar 270 and the crank stem 278. The spring 330 is confined between the end cap 280 on the winch housing and a shoulder 332 at the inner end of the collar 270. As shown in FIGS. 14 and 15 a detent device is provided for indicating the operative positions of the crank stem 278. The detent comprises a slot 340 in the crank stem 278 and a hairpin type spring 342 having one end secured by a screw 344 to one end of the spring 330 and its other end 346 engaging the edge of slot 340 in the crank stem. As shown in FIG. 15, the spring 330 has one end 348 bent inwardly and engaging the opposite edge of the slot 340 in the crank stem. It will be seen that clockwise rotation of crank stem 278 will effect engagement of the edge of the slot 340 with the end 348 of the spring 330 in a direction tending to contract the coils of the spring 330, thereby enabling the spring 330 to rotate with the crank stem. However, if the crank stem 278 is rotated in a counterclockwise direction, the other edge of the slot 340 will engage the end 346 of spring 342 which will thereupon react against the end 348 of the spring 330 in a direction tending to expand the coils of the spring 330 into locking engagement with the collar 270, thus preventing counterclockwise rotation of the crank handle at all times. The end 346 of the spring 342 is adapted to engage within any one of the three detents 350 formed along one edge of the slot 340 in the crank stem to indicate the several operative positions of the crank stem.

The stem 278 is provided with an annular shoulder 352 and a spring 354 is confined between the shoulder 352 and the end of spring 330 to urge the crank toward its innermost or left-hand position as viewed in FIG. 11.

The line 176 forms a linkage between the headboard 131 and the boom 16, and such linkage automatically positions the arm 138 supporting the sail 12 at the correct angle relative to the position of the boom 16. As the boom 16 is swung about the axis of shaft 154, the winding drums 170 and 172 will be rotated in the same direction, thereby winding the line 176 onto one of such drums while unwinding it from the other to effect rotation of pulley 136 and arm 138. This action maintains the proper camber in the sail throughout the height of the sail and maintains the angle of the top of the sail relative to the mast consonant with the foot of the sail. The collar 20 to which the upper ends of the stays are connected coincides with the axis of the offset portion 150 of the mast, the latter being rotatably supported on the deck or other portion of the boat. Therefore, the mast will automatically rotate to face into the wind to minimize drag and turbulence at the forward edge of the sail.

As shown in FIG. 1, the line 76 which is connected to the foot rope 72 by means of outhaul 73 extends around a pulley 370 and back to a crank 372 which may be employed for tightening or otherwise adjusting the foot rope 72 to obtain the proper degree of curvature of the mainsail 12. The crank 372 may have a suitable ratchet or other locking mechanism associated therewith to maintain the same in an adjusted position.

It will be seen that I have described herein a sailboat having many novel features and a number of control devices for the sails which present many advantages. The adjustable supporting device for the jib 14 enables pointing closer into the wind because of a substantial reduction in the interference of the jib with the mainsail made possible by this device. This provision also enables coming about more rapidly because the jib can be quickly back-winded simply by hauling on the appropriate one of the lines 44 or 47.

The rigging of the mainsail 12 and the winch employed in conjunction therewith enables one person to roll the mainsail on the boom and also permits the boom to be locked at any point to permit tightening of the sail. In addition, the construction of the mainsail will effect more efficient performance at low angles of attack because of the reduction of luffing or fluttering. The streamlined construction of the mast and mainsail also improves efficiencies because of the substantial reduction of drag and turbulence at the juncture of the mainsail with the mast. Other advantages of the disclosed structure will be apparent to those skilled in the art.

The sail with two inflatable luff pockets and a rotating mast described above permits a very close approach to the ideal airfoil shape. However, this is quite an elaborate structure, and rotating masts are forbidden by racing yacht rules. An almost equally effective aerodynamic shape can be achieved with a fixed mast and with a double luff sail, each luff running around the mast to a slot near the front of the mast. With stiff plastic material like Mylar this type sail takes quite a satisfactory aerodynamic shape with smooth continuous lines and the maximum curvature to leeward.

FIGS. 16–19 illustrate a modified construction employing a fixed mast and a double luff sail. The main portion of the mast 410 in the modified form of the invention is supported on an offset portion 412. The main portion of the mast may comprise an outer tubular member 416 of extruded aluminum having a tranvserse web 418 defining a semi-circular channel 420 containing one or more wooden inserts 422, each of which may be several feet in length and cemented or bolted in place, to impart the necessary strength to the mast at points of maximum stress.

A supporting bracket 424 is secured on the upper end of the offset section 412 and projects rearwardly through a slot 426 in the forward edge of the mast into a vertically extending tunnel 428. The bracket may consist of two sheet metal plates provided with vertically extending complementary grooves which are adapted to receive a reinforcing element 430 which substantially closes the slot 426, and the plates then separate into opposed arms 431 within the tunnel 428.

The boom 432 is provided with a central bore through which the outhaul 434 extends and a channel 436 along its top edge through which the footrope 438 extends. The sail 12 is provided with a flexible gussett 440 to obtain the varying curvatures required of the sail 12, the construction in this respect being the same as in the previous modification. A reel 442 is rotatably mounted on the offset portion 412 of the mast and is connected to the forward end of the boom 432 by a universal joint 444. The outhaul 434 extends through the reel 442 and around a pair of sheaves 446 within the offset portion 412 and then rearwardly to a crank as previously described to permit tightening of the sail.

The sail is provided with two fairing panels 460 and 462 which extend around the mast to the slot 426. A pair of boltropes 464 and 466 extend through the tunnel 428 in the mast on either side of the arms 431 and the forward edges of the fairing panels 460 and 462 are secured to the boltropes 464 and 466 respectively. The boltropes 464 and 466 are spliced at their lower ends to the end of the footrope 438 which extends upwardly from the forward end of the boom 432 around a sheave 468.

A gaff 476 is pivoted at its forward end on a shaft 478 which extends between a cam block 472 and bearing block 474 located at the upper end of the mast. The halyard 480 is attached at one end to the sail 12 along the seam defined by the juncture of the sail 12 and the fairing panels 460 and 462 and extends around a block 482 provided at the trailing end of the gaff 476 and then around a block 484 located at the upper end of the mast within the channel 420. Referring to FIG. 17, the cam block 472 is provided with a cam surface 486 which is engaged by a roller 488 journaled on a horizontally extending pin 490 secured to the under side of the gaff 476. When the boom 432 is pulled down tightly the tension on the sail will cause the roller 488 to position itself at the lowest portion 492 of the cam surface 486, which is along the center line of the boat, thereby holding the gaff 476 at or near its center position. This condition is obtained whenever the boat is close-hauled. When the boat runs ahead of the wind, the downhaul tension on the sail is released so that the gaff is free to pivot on its supporting shaft 478 as the roller 488 rises along the cam surface 486 to leeward. The gaff is, therefore, free to generally follow the boom as the latter swings to either side, and the gaff and boom will be generally parallel to obtain the desired airfoil shape of the sail.

The halyard 480 passes around the block 484 and through a channel 494 defined by the arms 431 which serve to separate the various lines that run through the mast. The halyard passes around a block 500 at the lower end of the mast and then around a pair of blocks 502 within the offset portion 412 and then to the winch.

As shown in FIG. 18, the upper end of each bolt-rope is provided with a metal cap 504 which has a slot 506 extending from the center of the closed end of the cap to a larger radial opening 508. The connector cap 504 may be secured on the boltrope by soaking the end of the rope in a plastic material and then swaging the cap in place before the plastic dries. A line 510 is secured to the upper end of each boltrope by means of the connector 504 and a metal lug 512 secured on the lower end of the line 510 and having an enlarged spherical end 514 adapted to be inserted into the opening 508 in the cap 504 and then pushed inwardly so that the reduced portion 516 of the lug 512 slides to the upper end of the slot 506 in the cap 504 to provide a coaxial connection between each boltrope and its line 510. The lines 510 pass around blocks 520 at the upper end of the mast and then downwardly through the channel 494 on either side of the halyard 480. The other ends of lines 510 are suitably secured to the halyard 480, as indicated at 521, so that only a single line constituting the halyard 480 passes around the block 500. With this arrangement, when the halyard 480 is wound up on the winch drum in the manner described, the sail will be raised by the halyard 480 and at the same time the boltropes 464 and 466 will be pulled upwardly through the mast to raise the luff of the sail as the sail unwinds from the boom. The lines 510 are readily detachable from the boltropes when the sail is to be removed from the mast.

In this form of the invention the sail is again reefed or furled by rolling it on the boom. This is accomplished as in the previous modification by rotating the reel 442 by means of a winch of the type described, or in some other suitable manner while the halyard 480 is allowed to unwind under a controlled drag as described. The stays 18 and the jib halyard 23 are attached to a bracket 522 which projects forwardly from the mast.

I claim:

1. In a fore-and-aft rigged sailboat having a mainsail and a jib, adjustable supporting means for the jib comprising a shaft rotatable on a generally vertically extending axis lying on the centerline of the boat, an arm extending laterally from said shaft, means securing the jib tack to the end of said arm, and means for rotating said shaft to swing said jib tack from one side of the boat to the other comprising a sheave having a spiral groove thereon, a pair of control lines wound onto said groove in opposite directions from the opposite ends of said groove so that as one line unwinds the other line is wound up, said groove being of increasingly smaller diameter as the groove progresses from either end thereof toward its mid-point whereby with a uniform pull on either line said jib tack is swing more rapidly through the mid-portion of its arc than at either end of said arc.

2. In a fore-and-aft rigged sailboat having a jib, adjustable supporting means for the jib comprising a shaft rotatable on a generally vertical axis lying on the centerline of the boat, an arm extending laterally from said shaft, means securing the jib tack to the end of said arm, a drive shaft, means providing a driving connection from said drive shaft to said first-mentioned shaft, a sheave secured on said drive shaft, said sheave having a continuous spiral groove thereon, said groove being of increasingly smaller diameter as the groove progresses from either end thereof toward its midpoint, control lines wound onto said groove in opposite directions from the larger diameter ends of said groove so that a pull on one line will rotate said drive shaft in one direction and a pull on the other line will rotate said drive shaft in the opposite direction.

3. In a fore-and-aft rigged sailboat having a jib, adjustable supporting means for the jib comprising a shaft rotatable on a generally vertically extending axis lying on the centerline of the boat, an arm extending laterally from said shaft, means securing the jib tack to the end of said arm, a drive shaft, means providing a driving connection from said drive shaft to said first-mentioned shaft, a pair of sheaves secured on said drive shaft, and control lines wound onto said sheaves in opposite directions so that a pull on one line will rotate said drive shaft in one direction and a pull on the other line will rotate said drive shaft in the opposite direction to swing said jib tack to an adjusted position along an arcuate path intersecting the center line of the boat.

4. In a fore-and-aft rigged sailboat having a mainsail and a jib, adjustable supporting means for the jib comprising a shaft rotatable on a generally vertically extending axis lying on the center line of the boat, a gear fixed on said shaft, a worm meshed with said gear, an arm extending laterally from said shaft, means securing the jib tack to the end of said arm, and means for rotating said worm for swinging the jib tack relative to the clew of the jib to an adjusted position along a semicircular path extending across the center line of the boat so as to lessen interference between the mainsail and jib in all normal sailing positions of the sail.

5. In a fore-and-aft rigged sailboat having a jib, adjustable supporting means for the jib tack comprising a shaft rotatable on a generally vertical axis, an arm extending laterally from said shaft, means securing the jib tack to the end of said arm, the clew of said jib being adapted to be detachably secured to a selected side of the boat, and means for rotating said shaft for swinging the jib tack relative to the jib clew to an adjusted position along a semicircular path extending across the centerline of the boat.

6. In a fore-and-aft rigged sailboat having a mainsail and a jib, adjustable supporting means for the jib comprising a shaft rotatable on a generally vertically extending axis lying on the centerline of the boat, a gear fixed on said shaft, a worm meshed with said gear, an arm extending laterally from said shaft, means securing the jib tack to the end of said arm, and pulley means for rotating said worm for swinging the jib tack relative to the jib clew to an adjusted position along a path extending across the centerline of the boat to increase the clearance between the mainsail and jib in all normal sailing positions of said sails.

7. In a fore-and-aft rigged sailboat having a mainsail and a jib, adjustable supporting means for the jib comprising a shaft rotatable on a generally vertically extending axis lying on the centerline of the boat, a gear fixed on said shaft, a worm meshed with said gear, an arm extending laterally from said shaft, means securing the jib tack to the end of said arm for movement therewith to an adjusted position along a circular path extending across the centerline of the boat, a drive shaft, pulley means for rotating said drive shaft, and a no-back device providing a driving connection from said drive shaft to said worm while preventing reverse drive from said worm to said drive shaft by a rotative force applied to said worm.

8. In a fore-and-aft rigged sailboat having a mainsail and a jib, the clew of said jib being adapted to be detachably secured to a selected side of the boat, and means secured to the jib tack for moving said jib tack relative to the jib clew to an adjusted position on a selected side of the centerline of the boat to increase the clearance and thereby reduce interference between the mainsail and jib in normal sailing positions of said sails.

9. In a fore-and-aft rigged sailboat having a mainsail and a jib, the clew of said jib being adapted to be detachably secured to either side of the boat, a shaft rotatable on a generally vertical axis on the centerline of the boat, an arm extending laterally from said shaft, means securing the jib tack to the end of said arm, and means for rotating said shaft for swinging said jib tack relative to the jib clew to an adjusted position along a semicircular path extending across the centerline of the boat so that said jib tack may be disposed on the leeward side of said centerline to increase the clearance between the mainsail and jib when sailing into the wind.

References Cited in the file of this patent

UNITED STATES PATENTS

| | | |
|---|---|---|
| 1,213,418 | Roper | Jan. 23, 1917 |
| 1,438,246 | Koelkebeck | Dec. 12, 1922 |
| 1,442,623 | Linnemann | Jan. 16, 1923 |
| 1,492,827 | Begas | May 6, 1924 |
| 1,613,890 | Herreshaff | Jan. 11, 1927 |
| 1,891,555 | Rockwood | Dec. 20, 1932 |
| 2,106,432 | McIntyre | Jan. 25, 1938 |
| 2,484,687 | Carl | Oct. 11, 1949 |
| 2,569,318 | Kersten | Sept. 25, 1951 |
| 2,884,800 | Carroll | May 5, 1959 |
| 2,893,339 | Ram | July 7, 1959 |
| 2,907,225 | Pischke | Oct. 6, 1959 |
| 2,973,737 | Olson | Mar. 7, 1961 |